US012811244B2

(12) United States Patent
Kuroda et al.

(10) Patent No.: US 12,811,244 B2
(45) Date of Patent: Nov. 24, 2026

(54) LITHIUM-ION SECONDARY BATTERY, SEPARATION MEMBRANE, AND METHOD FOR MANUFACTURING THESE

(71) Applicant: LG ENERGY SOLUTION, LTD., Seoul (KR)

(72) Inventors: Naoto Kuroda, Tokyo (JP); Hiroki Mikuni, Tokyo (JP)

(73) Assignee: LG Energy Solution, Ltd., Seoul (KR)

( * ) Notice: Subject to any disclaimer, the term of this patent is extended or adjusted under 35 U.S.C. 154(b) by 570 days.

(21) Appl. No.: 18/278,820

(22) PCT Filed: Mar. 25, 2021

(86) PCT No.: PCT/JP2021/012676
§ 371 (c)(1),
(2) Date: Aug. 24, 2023

(87) PCT Pub. No.: WO2022/201464
PCT Pub. Date: Sep. 29, 2022

(65) Prior Publication Data

US 2024/0178518 A1 May 30, 2024

(51) Int. Cl.
*H01M 50/411* (2021.01)
*H01M 10/0525* (2010.01)

(52) U.S. Cl.
CPC ..... *H01M 50/411* (2021.01); *H01M 10/0525* (2013.01)

(58) Field of Classification Search
CPC ........................ H01M 50/411; H01M 10/0525
See application file for complete search history.

(56) References Cited

U.S. PATENT DOCUMENTS

| | | | |
|---|---|---|---|
| 6,534,214 | B1 | 3/2003 | Nishijima et al. |
| 2020/0099089 | A1 | 3/2020 | Mimura et al. |

(Continued)

FOREIGN PATENT DOCUMENTS

| | | | |
|---|---|---|---|
| CN | 110945702 | A | 3/2020 |
| JP | 2001-110447 | A | 4/2001 |

(Continued)

OTHER PUBLICATIONS

Fan et al., "A Dual-Salt Gel Polymer Electrolyte with 3D Cross-Linked Polymer Network for Dendrite-Free Lithium Metal Batteries", Advanced Science, vol. 5, No. 10, 2018, article 1800559, DOI: 10.1002/advs.201800559.

*Primary Examiner* — Jane J Rhee

(74) *Attorney, Agent, or Firm* — Bryan Cave Leighton Paisner LLP

(57) ABSTRACT

One aspect of the present invention provides a lithium ion secondary battery comprising a positive electrode mixture layer, a separation membrane, and a negative electrode mixture layer in the stated order, wherein: the positive electrode mixture layer contains a positive electrode active material, a first lithium salt, and a first solvent, the negative electrode mixture layer contains a negative electrode active material, a second lithium salt, and a second solvent different from the first solvent, the separation membrane contains a polymer having lithium ion conductivity, a third lithium salt, and a third solvent, and the polymer is a polymer of polymerizable components that include a monomer and a thiol compound.

8 Claims, 2 Drawing Sheets

(56) References Cited

U.S. PATENT DOCUMENTS

| | | | | |
|---|---|---|---|---|
| 2020/0153033 | A1 | 5/2020 | Mimura et al. | |
| 2021/0057753 | A1* | 2/2021 | Viner | H01M 4/366 |
| 2022/0246897 | A1 | 8/2022 | Orita et al. | |
| 2022/0246988 | A1* | 8/2022 | Orita | H01M 10/052 |

FOREIGN PATENT DOCUMENTS

| | | | |
|---|---|---|---|
| KR | 10-2011-0137567 | A | 12/2011 |
| TW | 202107761 | A | 2/2021 |
| WO | 2019-017310 | A1 | 1/2019 |
| WO | 2020-250892 | A1 | 12/2020 |
| WO | 2020250394 | A1 | 12/2020 |

* cited by examiner

【FIG. 1】
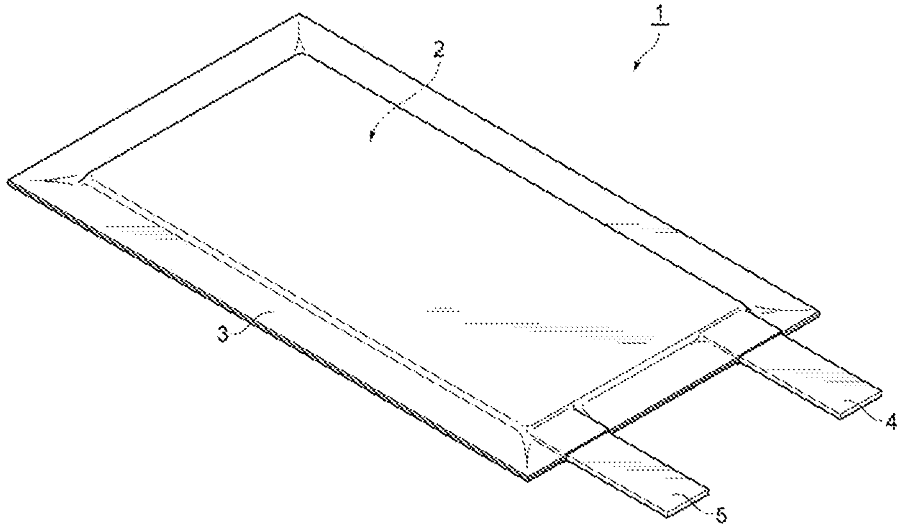

【FIG. 2】
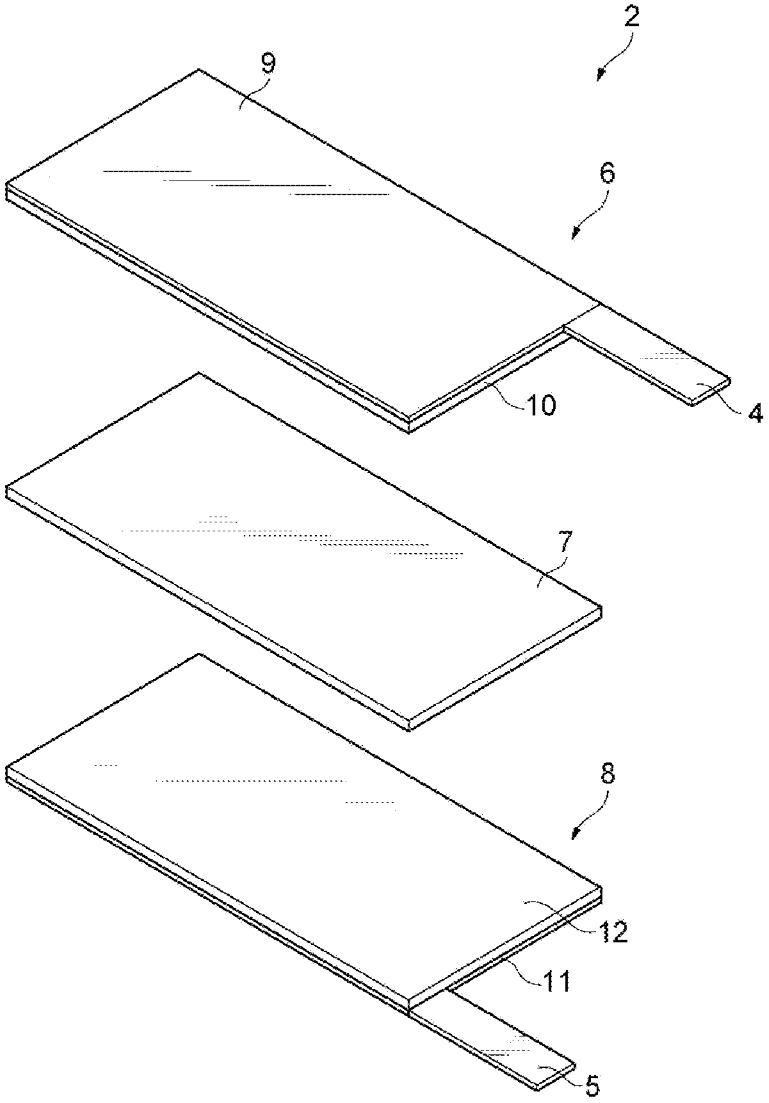

LITHIUM-ION SECONDARY BATTERY, SEPARATION MEMBRANE, AND METHOD FOR MANUFACTURING THESE

This application is a National Phase entry pursuant to 35 U.S.C. 371 of International Application No. PCT/JP2021/012676, filed on Mar. 25, 2021, the disclosure of which is incorporated herein by reference in its entirety.

TECHNICAL FIELD

The present invention relates to a lithium ion secondary battery, a separation membrane, and a method for manufacturing these.

BACKGROUND

In recent years, with the spread of portable electronic devices, electric vehicles, and the like, secondary batteries typified by lithium ion secondary batteries are required to further improve the performance. For example, technology for improving the performance of lithium ion secondary batteries by containing different types of electrolytes in the positive electrode and the negative electrode is under study (e.g., Patent Literature 1).

PRIOR ART LITERATURE

Patent Literature

Patent Literature 1: Japanese Unexamined Patent Publication No. 2001-110447

DETAILED DESCRIPTION OF THE INVENTION

Technical Problem

In a lithium ion secondary battery in which different types of electrolytes are contained in the positive electrode and the negative electrode, it is important that the solvent contained in the electrolyte is sufficiently separated without mixing between the positive electrode and the negative electrode. The present inventors considered disposing a separation membrane between the positive electrode and the negative electrode in order to separate the solvent in the electrolyte in such a lithium ion secondary battery. The separation membrane used for such applications preferably has high ionic conductivity.

It is an object of the present invention to provide a separation membrane having high ionic conductivity, which is used in a lithium ion secondary battery in which a positive electrode mixture layer and a negative electrode mixture layer contain different solvents from each other, and a lithium ion secondary battery comprising such a separation membrane, and a method for manufacturing the these.

Technical Solution

According to one aspect of the present invention, there is provided a lithium ion secondary battery comprising a positive electrode mixture layer, a separation membrane, and a negative electrode mixture layer in the stated order, wherein: the positive electrode mixture layer contains a positive electrode active material, a first lithium salt, and a first solvent, the negative electrode mixture layer contains a negative electrode active material, a second lithium salt, and a second solvent different from the first solvent, the separation membrane contains a polymer having lithium ion conductivity, a third lithium salt, and a third solvent, and the polymer is a polymer of polymerizable components that include a monomer and a thiol compound.

According to another aspect of the present invention, there is provided a separation membrane for being disposed between a positive electrode mixture layer and a negative electrode mixture layer, in a lithium ion secondary battery comprising a positive electrode mixture layer that contains a positive electrode active material, a first lithium salt and a first solvent, and a negative electrode mixture layer that contains a negative electrode active material, a second lithium salt and a second solvent different from the first solvent, wherein the separation membrane contains a polymer having lithium ion conductivity, a third lithium salt, and a third solvent, and wherein the polymer is a polymer of polymerizable components that include a monomer and a thiol compound.

According to another aspect of the present invention, there is provided a method for manufacturing a lithium ion secondary battery, comprising: obtaining a positive electrode comprising a positive electrode mixture layer that contains a positive electrode active material, a first lithium salt, and a first solvent; obtaining a negative electrode comprising a negative electrode mixture layer that contains a negative electrode active material, a second lithium salt, and a second solvent different from the first solvent; forming a slurry containing polymerizable components including a monomer and a thiol compound, a tertiary lithium salt, and a tertiary solvent into a membrane, and then reacting the polymerizable components to obtain a separation membrane; and providing the separation membrane between the positive electrode and the negative electrode.

According to yet another aspect of the present invention, there is provided a method for manufacturing a separation membrane for being disposed between a positive electrode mixture layer and a negative electrode mixture layer, in a lithium ion secondary battery comprising a positive electrode mixture layer that contains a positive electrode active material, a first lithium salt and a first solvent, and a negative electrode mixture layer that contains a negative electrode active material, a second lithium salt and a second solvent different from the first solvent, wherein the method comprises forming a slurry containing polymerizable components including a monomer and a thiol compound, a tertiary lithium salt, and a tertiary solvent into a membrane, and then reacting the polymerizable components to obtain a separation membrane.

In each aspect, the thiol compound may have two or more thiol groups.

In each aspect, the monomer may include a first monomer having two (meth)acryloyl groups and a second monomer having three or more (meth)acryloyl groups.

Advantageous Effects

According to one aspect of the present invention, a separation membrane having high ionic conductivity, which is used in a lithium ion secondary battery in which a positive electrode mixture layer and a negative electrode mixture layer contain different solvents, and a lithium ion secondary battery comprising the separation membrane, and a method for manufacturing these can be provided. According to one aspect of the present invention, a separation membrane can be provided in a shorter time. According to one aspect of the present invention, a method for manufacturing a separation membrane having improved productivity is provided. Since the separation membrane according to one aspect of the present invention has excellent film-forming characteristic, it is difficult to be limited by the equipment used during film formation, and more stable production of a separation membrane with a larger area is possible.

BRIEF DESCRIPTION OF THE DRAWINGS

FIG. 1 is a perspective view showing a lithium ion secondary battery according to one embodiment; and FIG. 2 is an exploded perspective view showing one embodiment of an electrode group in the lithium ion secondary battery shown in FIG. 1.

DETAILED DESCRIPTION OF THE EMBODIMENTS

Hereinafter, one embodiment of the present invention is described while appropriately referring to the accompanying drawings. However, the present invention is not limited to the following embodiments. In the following embodiments, moreover, it is needless to say that the constituent elements (including process steps, etc.) are not necessarily essential unless explicitly specified to be so or apparently essential in principle. This will apply also to numerical values and ranges, which should not be construed as unduly limiting the present invention.

In the specification, the “step” includes an independent step. Further, if a step cannot be clearly distinguished from other steps, the step is included in the “step” as long as the step attains its prescribed effects. The numerical range indicated by using “to” means a range including numerical values indicated before and after the “to” as a minimum value and a maximum value, respectively.

Further, as for the content of each component in the composition in the specification, when plural substances corresponding to these components are present in the composition, unless otherwise indicated, the content means the total amount of these plural substances in the composition.

As used herein, (meth)acrylic acid means an acrylic acid or the corresponding methacrylic acid thereof. The same applies to other similar expressions such as (meth)acrylate.

FIG. 1 is a perspective view showing a lithium ion secondary battery according to one embodiment. As shown in FIG. 1, a lithium ion secondary battery 1 according to one embodiment is a so-called laminated type secondary battery that comprises an electrode group 2 and a bag-type battery outer packaging body 3 that houses the electrode group 2. The electrode group 2 is provided with a positive electrode current collector tab 4 and a negative electrode current collector tab 5. The positive electrode current collector 4 and the negative electrode current collector tab 5 each protrude from the inside of the battery outer packaging body 3 to the outside, so that the positive electrode current collector and the negative electrode current collector (details will be described later) can be electrically connected to the outside of the lithium ion secondary battery 1. In another embodiment, the lithium ion secondary battery 1 may have a shape (coin type, cylindrical type, etc.) other than a laminated shape.

The battery outer packaging body 3 may be a container formed of, for example, a laminated film. The laminated film may be, for example, a laminated film in which a polymer film such as a polyethylene terephthalate (PET) film, a metal foil such as aluminum, copper, or stainless steel, and a sealant layer such as polypropylene are laminated in the stated order.

FIG. 2 is an exploded perspective view showing one embodiment of an electrode group 2 in the lithium ion secondary battery 1 shown in FIG. 1. As shown in FIG. 2, the electrode group 2 according to the present embodiment includes a positive electrode 6, a separation membrane 7, and a negative electrode 8 in the stated order. The positive electrode 6 includes a positive electrode current collector 9 and a positive electrode mixture layer 10 provided on the positive electrode current collector 9. A positive current collector tab 4 is provided on the positive electrode current collector 9. The negative electrode 8 includes a negative electrode current collector 11 and a negative electrode mixture layer 12 provided on the negative electrode current collector 11. A negative electrode collector tab 5 is provided on the negative electrode current collector 11.

The positive electrode current collector 9 is made of, for example, aluminum, titanium, stainless steel, nickel, calcined carbon, conductive polymer, conductive glass, or the like. The thickness of the positive electrode current collector 9 may be, for example, 1 μM or more and 50 μM or less.

The negative electrode current collector 11 is formed of, for example, copper, stainless steel, nickel, aluminum, titanium, calcined carbon, conductive polymer, conductive glass, aluminum-cadmium alloy, or the like. The thickness of the negative electrode current collector 11 may be, for example, 1 μM or more and 50 μM or less.

In one embodiment, the positive electrode mixture layer 10 contains a positive electrode active material, a lithium salt (first lithium salt), and a solvent (first solvent).

The positive electrode active material may be, for example, lithium oxide. Examples of the lithium oxide include $Li_xCoO_2$, $Li_xNiO_2$, $Li_xMnO_2$, $Li_xCo_yNi_{1-y}O_2$, $Li_xCo_yMi_{1-y}O_z$, $Li_xNi_{1-y}M_yO_z$, $Li_xMn_2O_4$ and $Li_xMn_{2-y}M_yO_4$ (in each formula, M represents at least one element selected from the group consisting of Na, Mg, Sc, Y, Mn, Fe, Co, Cu, Zn, Al, Cr, Pb, Sb, V and B (provided that M is an element different from other elements in each formula), x=0~1.2, y=0~0.9, z=2.0~2.3). The lithium oxide represented by $Li_xNi_{1-y}M_yO_z$ may be $Li_xNi_{1-(y1+y2)}Co_{y1}Mn_{y2}O_z$ (provided that x and z are the same as those described above, y1=0~0.9, y2=0~0.9, and y1+y2=0~0.9), and may be, for example, $LiNi_{1/3}Co_{1/3}Mn_{1/3}O_2$, $LiNi_{0.5}Co_{0.2}Mn_{0.3}O_2$, $LiNi_{0.6}Co_{0.2}Mn_{0.2}O_2$, $LiNi_{0.8}Co_{0.1}Mn_{0.1}O_2$. The lithium oxide represented by $Li_xNi_{1-y}M_yO_z$ may be $Li_xNi_{1-(y3+y4)}Co_{y3}Al_{y4}O_z$ (provided that x and z are the same as those described above, y3=0~0.9, y4=0~0.9, and y3+y4=0~0.9), and may be, for example, $LiNi_{0.8}Co_{0.015}Al_{0.05}O_2$.

The positive electrode active material may be lithium phosphate. Examples of the lithium phosphate include lithium manganese phosphate ($LiMnPO_4$), lithium iron phosphate ($LiFePO_4$), lithium cobalt phosphate ($LiCoPO_4$), and lithium vanadium phosphate ($Li_3V_2(PO_4)_3$).

The content of the positive electrode active material may be 70% by mass or more, 80% by mass or more, or 85% by mass or more based on the total amount of the positive electrode mixture layer. The content of the positive electrode active material may be 95% by mass or less, 92% by mass or less, or 90% by mass or less based on the total amount of the positive electrode mixture layer.

The first lithium salt may be, for example, at least one selected from the group consisting of $LiPF_6$, $LiBF_4$, $LiClO_4$, $LiB(C_6H_5)_4$, $LiCH_3SO_3$, $CF_3SO_2OLi$, $LiN(SO_2F)_2$ (LiFSI, lithium bisfluorosulfonylimide), $LiN(SO_2CF_3)_2$ (LiTFSI, lithium bistrifluoromethanesulfonylimide), and $LiN(SO_2CF_2CF_3)_2$.

The content of the first lithium salt may be 0.5 mol/L or more, 0.7 mol/L or more, or 0.8 mol/L or more, and 1.5 mol/L or less, 1.3 mol/L or less, or 1.2 mol/L or less based on the total amount of the first solvent.

The first solvent is a solvent for dissolving the first lithium salt. Examples of the first solvent include a cyclic carbonate such as ethylene carbonate, propylene carbonate, vinylene carbonate, vinyl ethylene carbonate, fluoroethylene carbonate, and difluoroethylene carbonate, a chained carbonate such as dimethyl carbonate, diethyl carbonate, and ethyl methyl carbonate, a cyclic ester such as γ-butyrolactone, γ-valerolactone, δ-valerolactone, ε-caprolactone, and γ-hexanolactone, an ether such as tetrahydrofuran, 1,3-dioxane, dimethoxyethane, diethoxyethane, methoxyethoxyethane, glyme, diglyme, triglyme and tetraglyme, a phosphoric acid ester such as phosphoric acid triester, a nitrile such as acetonitrile, benzonitrile, adiponitrile, and glutaronitrile, a chain sulfone such as dimethyl sulfone and diethyl sulfone, a cyclic sulfone such as sulfolane, a cyclic sulfonic acid ester such as propanesultone, and the like. The first solvent can be used singly or in combination of two or more types.

The solvent preferably used as the first solvent is a solvent having excellent oxidation resistance, such as acetonitrile and ethylene carbonate. Thereby, it is possible to increase the oxidation resistance of the positive electrode mixture layer 10.

The content of the first solvent contained in the positive electrode mixture layer 10 can be appropriately set within a range in which the first lithium salt can be dissolved, but for example, it may be 10% by mass or more and 80% by mass or less based on the total amount of the positive electrode mixture layer.

The positive electrode mixture layer 10 may further contain a binder and a conductive material as other components.

The binder may be a polymer containing, as a monomer unit thereof, at least one selected from the group consisting of tetrafluoroethylene, vinylidene fluoride, hexafluoropropylene, acrylic acid, maleic acid, ethyl methacrylate, methyl methacrylate, and acrylonitrile, rubber such as styrene-butadiene rubber, isoprene rubber, acrylic rubber, and like. The binder is preferably polyvinylidene fluoride or a copolymer containing hexafluoropropylene and vinylidene fluoride as the monomer unit.

The content of the binder may be 0.3% by mass or more, 0.5% by mass or more, 1% by mass or more, or 1.5% by mass or more, and 10% by mass or less, 8% by mass or less, 6% by mass or less, or 4% by mass or less, based on the total amount of the positive electrode mixture layer.

The conductive material may be a carbon material such as carbon black, acetylene black, graphite, carbon fiber, or carbon nanotube, and the like. These conductive materials are used singly or in combination of two or more types.

The content of the conductive material may be 0.1% by mass or more, 1% by mass or more, or 3% by mass or more based on the total amount of the positive electrode mixture layer. The content of the conductive material is preferably 15% by mass or less, more preferably 10% by mass or less, and still more preferably 8% by mass or less based on the total amount of the positive electrode mixture layer, from the viewpoint of suppressing the increase in the volume of the positive electrode 6 and the decrease in the energy density of the lithium ion secondary battery 1 associated therewith.

The thickness of the positive electrode mixture layer 10 may be 5 μm or more, 10 μm or more, 15 μm or more, or 20 μm or more, and 100 μm or less, 80 μm or less, 70 μm or less, or 50 μm or less.

In one embodiment, the negative electrode mixture layer 12 contains a negative electrode active material, a lithium salt (second lithium salt), and a solvent (second solvent).

As the negative electrode active material, those commonly used in the field of energy devices can be used. Specific examples of the negative electrode active materials include metal lithium, lithium titanate ($Li_4Ti_5O_{12}$), lithium alloy or other metal compounds, carbon materials, metal complexes, organic polymer compounds, and the like. These negative electrode active materials are used singly or in combination of two or more types. Examples of the carbon material may include graphite such as natural graphite (flaky graphite, etc.), and artificial graphite, amorphous carbon, carbon fiber, and carbon black such as acetylene black, ketjen black, channel black, furnace black, lamp black, thermal black, and the like. The negative electrode active material may be a negative electrode active material containing silicon as a constituent element, a negative electrode active material containing tin as a constituent element, or the like, from the viewpoint of obtaining a larger theoretical capacity (e.g., 500 to 1500 Ah/kg). Among them, the negative electrode active material may be a negative electrode active material containing silicon as a constituent element.

The negative electrode active material containing silicon as a constituent element may be an alloy containing silicon as a constituent element, and an example thereof may be an alloy containing silicon and at least one selected from the group consisting of nickel, copper, iron, cobalt, manganese, zinc, indium, silver, titanium, germanium, bismuth, antimony and chromium as a constituent element. The negative electrode active material containing silicon as a constituent element may be an oxide, a nitride, or a carbide, and a specific example thereof may be a silicon oxide such as SiO, $SiO_2$, and LiSiO, a silicon nitride such as $Si_3N_4$ and $Si_2N_2O$, a silicon carbide such as SiC, or the like.

The content of the negative electrode active material may be 60% by mass or more, 65% by mass or more, or 70% by mass or more based on the total amount of the negative electrode mixture layer. The content of the negative electrode active material may be 99% by mass or less, 95% by mass or less, or 90% by mass or less based on the total amount of the negative electrode mixture layer.

The type and content of the second lithium salt can be used if they are identical to those of the first lithium salt contained in the above-mentioned positive electrode mixture layer 10. The second lithium salt may be the same as or different from the first lithium salt.

The second solvent is a solvent for dissolving the second lithium salt. As the second solvent, the solvent identical to that used as the first solvent can be used, but a solvent different from the first solvent may be used. Thereby, since suitable solvents can be used for the positive electrode 6 and the negative electrode 8, respectively, it is possible to improve various performances of the lithium ion secondary battery 1, such as energy density and life improvement.

The solvent preferably used as the second solvent is a solvent having excellent oxidation resistant property, such as γ-butyrolactone and tetrahydrofuran. Thereby, it is possible to suppress reductive decomposition of the second solvent contained in the negative electrode mixture layer 12.

The content of the second solvent contained in the negative electrode mixture layer 12 can be appropriately set within a range in which the second lithium salt can be dissolved, but it may be, for example, 10% by mass or more and 80% by mass or less based on the total amount of the negative electrode mixture layer.

The negative electrode mixture layer 12 may further contain a binder and a conductive material as other components. The types and contents of the binder and the conductive material can be used if they are identical to the types and contents of the binder and the conductive material in the above-mentioned positive electrode mixture layer 10.

The thickness of the negative electrode mixture layer 12 may be 10 μm or more, 15 μm or more, or 20 μm or more, and 100 μm or less, 80 μm or less, 70 μm or less, 50 μm or less, 40 μm or less, or 30 μm or less.

The separation membrane 7 is a separation membrane for being disposed between the positive electrode mixture layer 10 and the negative electrode mixture layer 12 in the lithium ion secondary battery 1. This separation membrane has a role of separating the first solvent and the second solvent contained in the positive electrode mixture layer 10 and the negative electrode mixture layer 12 from each other and thus preventing them from being mixed with each other. The separation membrane 7 allows exchange of lithium ions.

The separation membrane 7 contains a polymer having lithium ion conductivity, a lithium salt (third lithium salt), and a solvent (third solvent). The polymer having lithium ion conductivity is a polymer of polymerisable components that include a monomer and a thiol compound.

The polymer having lithium ion conductivity means a polymer having the property of being able to conduct lithium ions derived from the lithium salt in the presence of the lithium salt. Whether or not a polymer can conduct lithium ions can be confirmed by measuring the ionic conductivity of the polymer. If the peak of ion conductivity measured when 1 to 40% by mass of lithium salt is added to the polymer is $1\times10^{-6}$ S/cm or more, the polymer can be said to have lithium ion conductivity.

The polymer having lithium ion conductivity may be a polymer having at least one group selected from the group consisting of a carbonyl group and an ether group. The ether group includes a chain ether group and a cyclic ether group.

Examples of such a polymer having lithium ion conductivity include polyalkyl (meth)acrylates such as polymethyl (meth)acrylate; poly(polyalkylene glycol di(meth)acrylate) such as poly(ethylene glycol di(meth)acrylate); poly(meth) acrylic acid; polyacrylamide; polymethacrylamide; poly(N-isopropylacrylamide); polymethyl vinyl ketone; polyvinyl acetate; polyalkylene glycols such as polyethylene glycol, polypropylene glycol, and polytetramethylene ether glycol.

The monomer in the polymerizable component may include a first monomer having two (meth)acryloyl groups and a second monomer having three or more (meth)acryloyl groups. In this case, it is possible to form a separation membrane that is thinner and has a lower resistance value.

The first monomer is a compound having two (meth) acryloyl groups and a linking group that links the two (meth)acryloyl groups. The linking group may include a hydrocarbon group and/or a heteroatom-containing group. The linking group is a hetero atom-containing group, which may include an oxygen atom-containing group, and for example, it may include an ether group (—O—). The linking group may be a divalent group consisting of a hydrocarbon group (e.g., an alkylene group) and a heteroatom-containing group (e.g., an ether group), and for example, it may be a polyoxyalkylene group or an oxyalkylene group.

The first monomer may be a monomer represented by the following formula (1-1).

[Chemical Formula 1]

(1-1)

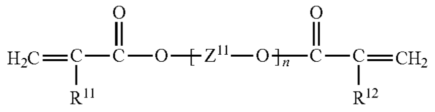

wherein, in formula (1-1), $R^{11}$ and $R^{12}$ each independently represent a hydrogen atom or a methyl group ($—CH_3$).

n represents an integer of 1 or more. n may be, for example, 5 or more, 10 or more, 15 or more, or 20 or more, and 40 or less, 35 or less, 30 or less, or 25 or less.

$Z^{11}$ represents an alkylene group. $Z^{11}$ may be, for example, an alkylene group having 1 to 6 carbon atoms or 1 to 3 carbon atoms. $Z^{11}$ may be, for example, $—CH_2—CH_2—$ or $—CH(CH_3)—CH_2—$.

The ionic conductivity of the first monomer at 25° C. may be, for example, 0.01 mS/cm or more, 0.05 mS/cm or more, or 0.10 mS/cm or more, and 1.0 mS/cm or less, 0.50 mS/cm or less, or 0.30 mS/cm or less.

The ionic conductivity of the first monomer at 25° C. can be measured by the method shown below.

Preparation of Separation Membrane for Measuring Ionic Conductivity

A first monomer, a lithium salt, a solvent and a photopolymerization initiator are mixed to prepare a slurry. A silicon rubber frame (4×4 cm, thickness: 1 mm) is mounted on a PET sheet (8×8 cm, thickness: 0.035), and the prepared slurry is placed in the frame. Then, ultraviolet light (wavelength: 365 nm) is irradiated to polymerize the first monomer, thereby obtaining a separation membrane. The separation membrane is removed from the frame and provided for the test described below. Here, the lithium salt may be $LiN(SO_2CF_3)_2$ (LiTFSI, lithium bistrifluoromethanesulfonylimide). The solvent may be 1-ethyl-3-methylimidazolium-bis(trifluoromethanesulfonyl)imide (EMI-TFSI). The photopolymerization initiator may be 2-hydroxy-2-methyl-1-phenylpropanone. The irradiation time of ultraviolet light (wavelength: 365 nm) may be 15 minutes.

Measurement of Ionic Conductivity

A test cell is prepared using the separation membrane, thereby evaluating the ionic conductivity of the separation membrane. An upper cover (CR2032 cap available from Hohsen Corp.), a 1.6 mm thick plate spring, a 1.0 mm thick SUS spacer (2 sheets), a separation membrane, gasket, a lower cover (CR2032 case available from Hohsen Corp.) are laminated in the stated order, and the upper cover and the lower cover are caulked to fabricate a test cell. The measurement device and measurement conditions are as follows.

Measurement device: VSP electrochemical measurement system (available from BioLogic)

Measurement temperature: 25° C.

AC amplitude: 10 mV

Frequency range: 10 mHz to 1 MHz

After the measurement, the ionic conductivity of the separation membrane was calculated according to the following formula (α).

$$\sigma=L/RA \quad (\alpha)$$

σ (S/cm): ionic conductivity

L (cm): thickness of separation membrane

R (Ω): bulk resistance

A ($cm^2$): cross-sectional area of SUS spacer

As the first monomer, a polyethylene glycol #1000 diacrylate (e.g., product name NK Ester A-1000 available from Shin-Nakamura Chemical Co., Ltd.) and a polyethylene glycol #800 diacrylate (e.g., product name NK Ester A-800 available from Shin-Nakamura Chemical Co., Ltd.) can be mentioned as an example.

A first monomer may be used singly or in combination of two or more types.

The content of the first polymer contained as a monomer unit in the polymer may be 5% by mass or more, 10% by mass or more, or 15% by mass or more, and 70% by mass or less, 60% by mass or less, or 50% by mass or less, based on the total amount of the separation membrane.

A second monomer is a monomer which has 3 or more (meth)acryloyl groups. The number of (meth)acryloyl groups in the second monomer may be, for example, 3 to 6, or may be 3 to 4, or may be 4.

The second monomer may be a compound having three or more (meth)acryloyl groups and a linking group that links these (meth)acryloyl groups. The linking group may include a hydrocarbon group and/or a heteroatom-containing group. The linking group is a heteroatom-containing group, which may include an oxygen atom-containing group, and for example, it may include an ether group (—O—). The linking group may be a divalent group consisting of a hydrocarbon group (e.g., alkylene group) and a heteroatom-containing group (e.g., ether group), and for example, it may be a polyoxyalkylene group or an oxyalkylene group.

The second monomer having three (meth)acryloyl groups may be a monomer represented by the following formula (1-2).

[Chemical Formula 2]

(1-2)

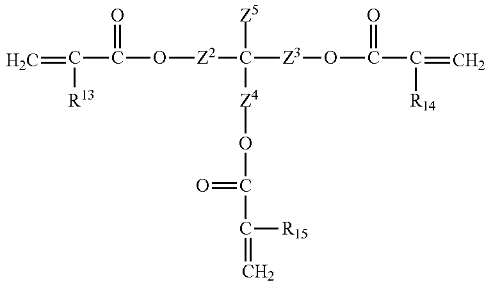

wherein, in formula (1-2), $R^{13}$, $R^{14}$ and $R^{15}$ each independently represent a hydrogen atom or a methyl group.

$Z^2$, $Z^3$ and $Z^4$ each independently represent an alkylene group. The alkylene group represented by $Z^2$, $Z^3$ and $Z^4$ may be an alkylene group having 1 to 6 or 1 to 3 carbon atoms, or may be a methylene group ($—CH_2—$).

$Z^5$ represents an alkyl group. $Z^5$ may be, for example, an alkyl group having 1 to 10, 1 to 6 or 1 to 3 carbon atoms, or may be an ethyl group ($—CH_2—CH_3$). A monovalent hydrocarbon group represented by X may be, for example, an alkyl group.

Examples of the second monomer having three (meth) acryloyl groups include trimethylolpropane triacrylate (e.g., product name NK Ester A-TMPT available from Shin-Nakamura Chemical Co., Ltd.).

The second monomer having four (meth)acryloyl groups may be a monomer represented by the following formula (1-3).

[Chemical Formula 3]

(1-3)

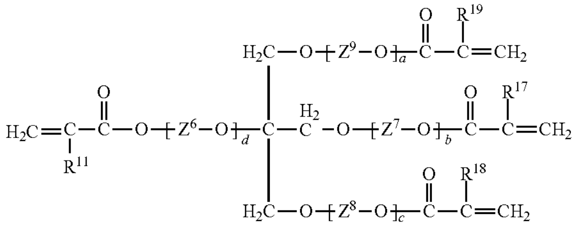

wherein, in formula (1-3), $R^{16}$, $R^{17}$, $R^{18}$ and $R^{19}$ each independently represent a hydrogen atom or a methyl group.

$Z^6$, $Z^7$, $Z^8$ and $Z^9$ each independently represent an alkylene group. The alkylene group represented by $Z^2$, $Z^3$ and $Z^4$ may be an alkylene group having 1 to 6 or 1 to 3 carbon atoms, or may be an ethylene group ($—CH_2—CH_2—$).

a, b, c and d each independently represents an integer of 0 or more or 1 or more. a+b+c+d may be 4 or more, 10 or more, 20 or more, or 30 or more, and may be 50 or less or 40 or less.

Examples of the second monomer having three (meth) acryloyl groups include ethoxylated pentaerythritol tetraacrylate (e.g., product name: NK Ester A-TM35E available from Shin-Nakamura Chemical Co., Ltd.).

The ionic conductivity of the second monomer at 25° C. may be, for example, 0.001 mS/cm or more, or 0.01 mS/cm or more, and may be 0.5 mS/cm or less, or 0.05 mS/cm or less. The ionic conductivity of the second monomer at 25° C. can be measured using the second monomer by the same method as the method for measuring the ionic conductivity of the first monomer at 25° C. In the measurement of the ionic conductivity of the second monomer at 25° C., the irradiation time of ultraviolet light (wavelength: 365 nm) may be 2 minutes.

A second monomer may be used singly or in combination of two or more types.

The content of the second polymer contained as a monomer unit in the polymer may be 5% by mass or more, 10% by mass or more, or 15% by mass or more, and 70% by mass or less, 60% by mass or less, or 50% by mass or less, based on the total amount of the separation membrane.

The ratio (C2/C1) of the mass (C2) of the second monomer to the mass (C1) of the first monomer, which is included as a monomer unit in the polymer, is 5 or less, 4 or less, 3 or less, or 2 or less, 1 or less, or ½ or less, from the viewpoint of further lowering the resistance value of the separation membrane. The ratio (C2/C1) of the mass (C2) of the second monomer to the mass (C1) of the first monomer, which is included as a monomer unit in the polymer, is ⅕ or more, ¼ or more, ⅓ or more, ½ or more, 1 or more, or 2 or more, from the viewpoint of being more excellent in the separation capability of the separation membrane.

The total content of the monomer included as a monomer unit may be 60% by mass or more, 70% by mass or more, or 80% by mass or more, and 90% by mass or less, 80% by mass or less, or 70% by mass or less.

A thiol compound is a compound having at least one thiol group (—SH). A separation membrane containing a polymer formed by a polymerization reaction in the presence of a thiol compound has high ionic conductivity. Further, when the polymerizable component contains a thiol compound, it enables film formation in a shorter time. The reason for enabling film formation in a shorter time is not particularly limited, but the following reasons can be considered. A thiol compound deprives a radical from a long-chain polymer whose reactivity is reduced during the course of a polymerization reaction to generate a thiyl radical (—S·). Since the thiyl radical can react with other intermediate polymers and/or unreacted monomers, it is believed that the generation of thiyl radicals accelerates the polymerization reaction and, as a result, enables film formation in a shorter period of time.

The number of thiol groups per molecule of the thiol compound is 1 or more, and may be, for example, 2 or more, 3 or more, or 4 or more, and 4 or less, or 3 or less.

The thiol compound may have a primary thiol group or a secondary thiol group. The thiol group in the thiol compound may be a secondary thiol group from the viewpoint of enabling film formation in a shorter time. The thiol compound may be a compound having 3 to 4 secondary thiol groups from the viewpoint of having higher ionic conductivity and enabling film formation in a shorter time. A secondary thiol group is a thiol group attached to a carbon atom that is attached to two carbon atoms and one hydrogen atom.

The thiol compound may be a compound represented by the following formula (1-4).

[Chemical Formula 4]

(1-4)

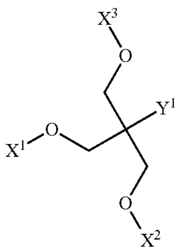

wherein, in formula (1-4), $X^1$, $X^2$ and $X^3$ each independently represent a monovalent group having a thiol group, and $Y^1$ represents an alkyl group or a group represented by —O—$X^4$, where $X^4$ is a monovalent group having a thiol group. V may be an alkyl group having 1 to 8, 1 to 6, or 1 to 3 carbon atoms, or may be a methyl group.

The monovalent group having a thiol group may be a group represented by the following formula (1-5) having a secondary thiol group.

[Chemical Formula 5]

(1-5)

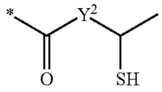

wherein, in formula (1-5), $Y^2$ represents an alkylene group. $Y^2$ may be an alkylene group having 1 to 8, 1 to 6, or 1 to 3 carbon atoms, or may be a methylene group (—$CH_2$—). In formula (1-5), * represents a bond (bonding site with an oxygen atom).

Examples of thiol compounds include pentaerythritol tetrakis(3-mercaptobutyrate) (e.g., "Karenz MT™ PE-1" available from Showa Denko K.K.) and trimethylolpropane tris(3-mercaptobutyrate) (e.g., "Karen MT™ TPMB" available from Showa Denko K.K.).

The thiol compounds exemplified above can be used alone or in combination of two or more.

The amount of the thiol compound is 1% by mass or more, 2% by mass or more, 3% by mass or more, or 4% by mass or more, and 20% by mass or less, or 15% by mass or less based on the total amount of the separation membrane, from the viewpoint of being more excellent in the separation capability of the separation membrane and further increasing the ionic conductivity of the separation membrane.

The content of the polymer may be 60% by mass or more, 70% by mass or more, or 80% by mass or more, and 90% by mass or less, 80% by mass or less, or 70% by mass or less, based on the total weight of the separation membrane.

The type of the third lithium salt may be identical to that of the first lithium salt contained in the above-mentioned positive electrode mixture layer 10. The tertiary lithium salt may be of the same as the first lithium salt and/or the second lithium salt, or may be different from the first lithium salt and/or the second lithium salt.

The content of the third lithium salt is preferably 5% by mass or more, more preferably 13% by mass or more, and still more preferably 15% by mass or more, based on the total amount of the third lithium salt and the third solvent, from the viewpoint of being excellent in the ionic conductivity of the separation membrane. The content of the third lithium salt is preferably 35% by mass or less, more preferably 23% by mass or less, and still more preferably 20% by mass or less, based on the total amount of the third lithium salt and the third solvent, from the viewpoint of the viscosity of the solvent.

The content of the third lithium salt is preferably 2% by mass or more, more preferably 3% by mass or more, and still more preferably 5% by mass or more based on the total weight of the separation membrane, from the viewpoint of further increasing the ion conductivity of the separation membrane 7.

The content of the third lithium salt is preferably 12% by mass or less, more preferably 9% by mass or less, and still more preferably 6% by mass or less based on the total weight of the separation membrane, from the viewpoint of further increasing the ionic conductivity of the separation membrane 7.

The third solvent is a solvent for dissolving the third lithium salt. From the viewpoint of suppressing volatilization from the separation membrane, the third solvent is preferably an ionic liquid or glyme represented by the following formula (2), more preferably an ionic liquid.

$$R^{21}O—(CH_2CH_2O)_k—R^{22} \quad (2)$$

[wherein, in formula (2), $R^{21}$ and $R^{22}$ each independently represent an alkyl group having 1 to 4 carbon atoms, and k represents an integer of 3 to 6]

The ionic liquid contains the following anion component and cation component. And, the ionic liquid used herein is a liquid substance at −20° C. or higher.

The anion component of the ionic liquid is not particularly limited, but includes a halogen anion such as $Cl^-$, $Br^-$ or $I^-$, an inorganic anion such as $BF_4^-$ or $N(SO_2F)_2^-$([FSI]$^-$), an organic anion such as $B(C_6H_5)_4^-$, $CH_3SO_2O^-$, $CF_3SO_2O^-$, $N(SO_2C_4F_9)_2^-$, $N(SO_2CF_3)_2^-$([TFSI]$^-$), or $N(SO_2C_2F_5)_2^-$, and the like. The anion component of the ionic liquid preferably contains at least one anion component represented by the following formula 3.

$$N(SO_2C_mF_{2m+1})(SO_2C_nF_{2n+1})^- \quad (3)$$

[wherein, in formula (3), m and n each independently represent an integer of 0 to 5. m and n may be the same as or different from each other, and are preferably the same as each other.]

The anion component represented by formula (3) is, for example, $N(SO_2C_4F_9)_2^-$, $N(SO_2F)_2^-$ ([FSI]$^-$), $N(SO_2CF_3)_2^-$([TFSI]$^-$) and $N(SO_2C_2F_5)_2^-$. From the viewpoint of improving the ion conductivity in the lithium ion secondary battery 1, the anion component of the ionic liquid more preferably contains at least one selected from the group consisting of $N(SO_2C_4F_9)_2^-$, $CF_3SO_2O^-$, [FSI]$^-$, [TFSI]$^-$ and $N(SO_2C_2F_5)_2$, and more preferably [FSI]$^-$.

The cationic component of the ionic liquid is not particularly limited, but is preferably at least one selected from the group consisting of chain quaternary onium cations, piperidinium cations, pyrrolidinium cations, pyridinium cations and imidazolium cations.

The chain quaternary onium cation is, for example, a compound represented by the following formula (4).

[Chemical Formula 6]

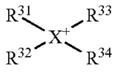

(4)

[wherein, in formula (4), $R^{31}$ to $R^{34}$ each independently represent a chain alkyl group having 1 to 20 carbon atoms or a chain alkoxy alkyl group represented by $R—O—(CH_2)_n—$ (where R represents a methyl group or an ethyl group, and n represents an integer of 1 to 4), and X represents a nitrogen atom or a phosphorus atom. The number of carbon atoms in the alkyl group represented by $R^{31}$ to $R^{34}$ is preferably 1 to 20, more preferably 1 to 10, still more preferably 1 to 5]

The piperidinium cation is a nitrogen-containing six-membered cyclic compound represented by, for example, the following formula (5).

[Chemical Formula 7]

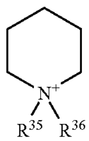

(5)

[wherein, in formula (5), $R^{35}$ and $R^{36}$ each independently represent an alkyl group having 1 to 20 carbon atoms or an alkoxyalkyl group represented by $R—O—(CH_2)_n—$ (where R represents a methyl group or an ethyl group, and n represents an integer of 1 to 4). The number of carbon atoms in the alkyl group represented by $R^{35}$ and $R^{36}$ is preferably 1 to 20, more preferably 1 to 10, still more preferably 1 to 5]

The pyrrolidinium cation is, for example, a 5-membered cyclic compound represented by the following formula (6).

[Chemical Formula 8]

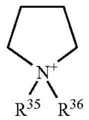

(6)

[wherein, in formula (6), $R^{37}$ and $R^{38}$ each independently represent an alkyl group having 1 to 20 carbon atoms or an alkoxyalkyl group represented by $R—O—(CH_2)_n-$ (where R represents a methyl group or an ethyl group, and n represents an integer of 1 to 4). The number of carbon atoms in the alkyl group represented by $R^{37}$ and $R^{38}$ is preferably 1 to 20, more preferably 1 to 10, still more preferably 1 to 5].

A pyridinium cation is, for example, a compound represented by the following formula (7).

[Chemical Formula 7]

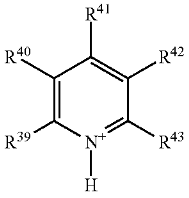

(7)

[wherein, in Formula (7), $R^{39}$ to $R^{43}$ are each independently an alkyl group having 1 to 20 carbon atoms or an alkoxyalkyl group represented by $R—O—(CH_2)_n—$ (where R represents a methyl group or an ethyl group, and n represents an integer of 1 to 4), or a hydrogen atom. The number of carbon atoms in the alkyl group represented by $R^{39}$ to $R^{43}$ is preferably 1 to 20, more preferably 1 to 10, still more preferably 1 to 5]

The imidazolium cation is, for example, a compound represented by the following formula (8).

[Chemical Formula 10]

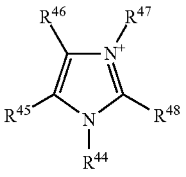

(8)

[wherein, in formula (8), $R^{44}$ to $R^{48}$ each independently represents an alkyl group having 1 to 20 carbon atoms or an alkoxyalkyl group represented by $R—O—(CH_2)_n—$ (where R represents a methyl group or an ethyl group, and n represents an integer of 1 to 4), or a hydrogen atom. The number of carbon atoms in the alkyl group represented by $R^{44}$ to $R^{48}$ is preferably 1 to 20, more preferably 1 to 10, still more preferably 1 to 5].

The ionic liquid may be, more specifically, N,N-diethyl-N-methyl-N-(2-methoxyethyl)ammonium-bis(trifluoromethanesulfonyl)imide(DEME-TFSI), N,N-diethyl-N-methyl-N-(2-methoxyethyl)ammonium-bis(fluorosulfonyl) imide(DEME-FSI), 1-ethyl-3-methylimidazolium-bis (trifluoromethanesulfonyl)imide(EMI-TFSI), 1-ethyl-3-methylimidazolium-bis(fluorosulfonyl)imide(EMI-FSI), N-methyl-N-propylpyrrolidinium-bis(trifluoromethanesulfonyl)imide(Py13-TFSI), N-methyl-N-propylpyrrolidinium-bis(fluorosulfonyl)imide(Py13-FSI), N-ethyl-N-methylpyrrolidinium-bis(trifluoromethanesulfonyl)imide (Py12-TFSI), N-ethyl-N-methylpyrrolidinium-bis (fluorosulfonyl)imide(Py12-FSI), 1-ethyl-3-methylimidazolium dicyanamide(EMI-DCA), and the like.

In the glyme represented by the above-mentioned formula (2), $R^{21}$ and $R^{22}$ in formula (2) each independently represent an alkyl group having 4 or less carbon atoms or a fluoroalkyl group having 4 or less carbon atoms, and k represents an integer of 1 to 6. $R^{21}$ and $R^{22}$ are each independently preferably a methyl group or an ethyl group.

Glyme may be specifically monoglyme (k=1), diglyme (k=2), triglyme (k=3), tetraglyme (k=4), pentaglyme (k=5), hexaglyme (k=6).

When the separation membrane 7 contains glyme as a solvent, a part or all of the glyme may form a complex with a lithium salt (third lithium salt).

The content of the third solvent may be 40% by mass or less, 38% by mass or less, 35% by mass or less, 33% by mass or less, 30% by mass or less, 25% by mass or less, 20% by mass or less, 18% by mass or less, 15% by mass or less, 13% by mass or less, or 10% by mass or less based on the total amount of the separation membrane, from the viewpoint of obtaining the separation membrane 7 having excellent separation capability of the solvents (first solvent and second solvent). The content of the third solvent may be 5% by mass or more, 8% by mass or more, 18% by mass or more, or 27% by mass or more based on the total amount of the separation membrane from the viewpoint of further increasing the ionic conductivity of the separation membrane 7.

The content of the third solvent can be measured by the method shown below. First, the separation membrane is diluted about 10 times with methanol, and then extracted for 15 minutes by ultrasonic irradiation to obtain an extract. 1.0 μL of this extract is injected into a gas chromatograph to perform gas chromatography mass spectrometry. Specific conditions for gas chromatography mass spectrometry are as follows.

Device name GC-4000 (available from GL Science)
Carrier gas: Helium 5.0 mL/min
Column: TC-WAX polyethylene glycol (0.53 mm I.D.×30 m, 1.0 μL)
Split ratio: 1/10
Injection temperature: 250° C.
Detection temperature: 250° C.
Oven temperature: heated from 60° C. (1 minute) at 20° C./min→240° C.
Detector: Hydrogen spark ionization detector (FID)
Range: $10^2$ The separation membrane 7 may further contain, for example, inorganic oxide particles as other components, or may not contain them from the viewpoint of further improving the ionic conductivity of the separation membrane.

The thickness of the separation membrane 7 is 80 μm or more, or 85 μm or less, and may be 400 μm or less, 300 μm or less, 200 μm or less, or 100 μm or less from the viewpoint of further enhancing the separation capability of the separation membrane 7.

The ionic conductivity of the separation membrane may be, for example, more than 0.05 mS/cm, or 0.06 mS/cm or more, and may be, for example, 0.15 mS/cm or less. The ionic conductivity of the separation membrane is measured by the method described in Examples below.

Subsequently, the manufacturing method of the lithium ion secondary battery 1 is described. A method for manufacturing a lithium ion secondary battery 1 according to one embodiment comprises a step of obtaining a positive electrode 6 comprising a positive electrode mixture layer 10 that contains a positive electrode active material, a first lithium salt, and a first solvent, a step of obtaining a negative electrode 8 comprising a negative electrode mixture layer 12 that contains a negative electrode active material, a second lithium salt, and a second solvent different from the first solvent, a step of forming a slurry containing polymerizable components including a monomer and a thiol compound, a tertiary lithium salt, and a tertiary solvent a membrane, and then reacting the polymerizable components to obtain a separation membrane 7, and a step of providing the separation membrane 7 between the positive electrode 6 and the negative electrode 8. The order of each step is arbitrary.

In the manufacturing method, specific aspects of the positive electrode active material, the first lithium salt, the first solvent, the negative electrode active material, the second lithium salt, the second solvent, the third lithium salt, and the third solvent are as described above.

In the step of obtaining the positive electrode and the step of obtaining the negative electrode, the positive electrode 6 and the negative electrode 8 can be obtained using a known method. For example, the material used for the positive electrode mixture layer 10 or the negative electrode mixture layer 12 is dispersed in an appropriate amount of dispersion medium using a kneader, a disperser, or the like to obtain a slurry-like positive electrode mixture or negative electrode mixture. Then, the positive electrode mixture or the negative electrode mixture is applied onto the positive electrode current collector 9 or the negative electrode current collector 11 by a doctor blade method, a dipping method, a spray method, or the like, and the dispersion medium is volatilized, thereby capable of obtaining a positive electrode 6 and a negative electrode 8. At this time, the dispersion medium may be water, N-methyl-2-pyrrolidone (NMP), or the like.

In the step of obtaining the separation membrane, a slurry containing polymerizable components including a monomer and a thiol compound, a tertiary lithium salt, and a tertiary solvent is prepared in one embodiment. Specific embodiments of the polymerizable compound including a monomer and a thiol compound are as described above.

The total content of the monomers in the slurry may be 60% by mass or more, or 70% by mass or more, and 90% by mass or less, or 80% by mass or less, based on the total amount of the slurry.

The content of the thiol compound in the slurry may be 1 part by mass or more, 2 parts by mass or more, 3 parts by mass or more, or 4 parts by mass or more, and 20 parts by mass or less, or 15 parts by mass or less, based on 100 parts by mass of the total amount of the monomers.

The content of the third solvent in the slurry may be 40% by mass or less, 38% by mass or less, 35% by mass or less, 33% by mass or less, 30% by mass or less, 25% by mass or less, 20% by mass or less, 18% by mass or less, 15% by mass or less, 13% by mass or less, or 10% by mass or less, based on the total amount of the slurry. The content of the third solvent may be 5% by mass or more, 8% by mass or more, 18% by mass or more, or 27% by mass or more based on the total amount of the slurry, from the viewpoint of further enhancing the ionic conductivity of the separation membrane 7. Thereby, the content of the third solvent contained in the separation membrane 7 can be set within the above range.

A polymerization initiator may be added to the slurry. Thereby, the polymerizable compound can be suitably polymerized, and the separation membrane can be suitably produced from the slurry. The polymerization initiator may be a thermal polymerization initiator or a photopolymerization initiator, and can be appropriately selected depending on the purpose.

Examples of the thermal polymerization initiator include azobisisobutyronitrile and azobis(2-methylbutyronitrile).

Examples of the photopolymerization initiator include 2-hydroxy-2-methyl-1-phenylpropanone, diphenyl (2,4,6-trimethylbenzoyl) phosphine oxide and the like.

The content of the polymerization initiator may be 0.5% by mass or more, 1% by mass or more, 10% by mass or more, or 20% by mass or more, and 50% by mass or less, 40% by mass or less, 30% by mass or less, 10% by mass or less, 5% by mass or less, or 3% by mass or less, based on the total amount of the slurry.

The slurry may further contain an inorganic filler as another component, or may not contain an inorganic filler.

In the step of obtaining the separation membrane, subsequently, the above-mentioned slurry is formed into a membrane, and then the polymerizable components are polymerized.

A method for forming the slurry into a membrane is, for example, a method in which a frame of an arbitrary size is provided on one surface of a substrate such as a PET sheet, and the slurry is injected therein. Alternatively, the slurry may be formed in a film state by applying the slurry onto one surface of the substrate by a doctor blade method, a dipping method, a spray method, or the like.

A method of polymerizing the polymerizable component is a method of applying heat under predetermined conditions when the slurry contains a thermal polymerization initiator. The heating temperature may be, for example, 80-90° C. The heating time may be appropriately adjusted in accordance with the heating temperature, and is, for example, 1 to 10 minutes.

A method for polymerizing a polymerizable component is a method of irradiating light under predetermined conditions when the slurry contains a photopolymerization initiator. In one embodiment, the polymerizable compound may be polymerized by irradiation with light (ultraviolet light) having a wavelength within the range of 200-400 nm.

In the step of providing the separation membrane 7 between the positive electrode 6 and the negative electrode 8, the positive electrode 6, the separation membrane 7 and the negative electrode 8 are laminated, for example, by lamination. Thereby, the electrode group 2 including the positive electrode 6, the negative electrode 8, and the separation membrane 7 provided between the positive electrode 6 and the negative electrode 8 can be obtained. Further, the lithium ion secondary battery 1 can be obtained by housing the electrode group 2 in the battery outer packaging body 3.

EXAMPLE

Hereinafter, the present invention will be described in more detail with reference to examples, but the present invention is not limited to these examples.

Example 11

Monomer represented by the following formula (A) (where n=23, product name NK Ester A-1000 available from Shin-Nakamura Chemical Co., Ltd.), Monomer represented by the following formula (B) (where a+b+c+d=35, product name NK Ester ATM-35E available from Shin-Nakamura Chemical Co., Ltd.), a lithium salt (LiTFSI), a solvent (EMI-TFSI), a photopolymerization initiator (methylbenzoylformate), and a thiol compound represented by the following formula (C) (pentaerythritol tetrakis(3-mercaptobutyrate), product name Karenz MT™ PE-1" available from Showa Denko K.K.) were mixed to prepare a slurry. The composition of each material was shown in Table 1 below. A silicone rubber frame (4 cm×4 cm, thickness: 1 mm) was mounted on a PET sheet (8 cm×8 cm, thickness: 0.035 mm), and the prepared slurry was placed in the frame. Then, ultraviolet light (wavelength: 365 nm) was irradiated to the slurry to polymerize the monomer, thereby obtaining a separation membrane. The separation membrane was removed from the frame and provided for the test described below. The film formation time (minimum exposure time) of the separation membrane was 50 seconds.

[Chemical Formula 11]

(A)

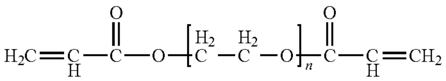

[Chemical Formula 12]

(B)

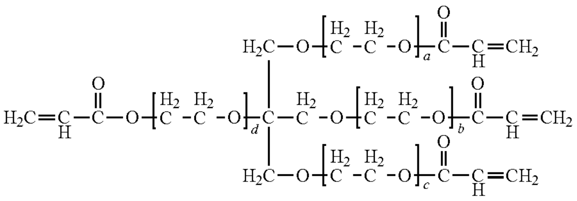

[Chemical Formula 13]

(C)

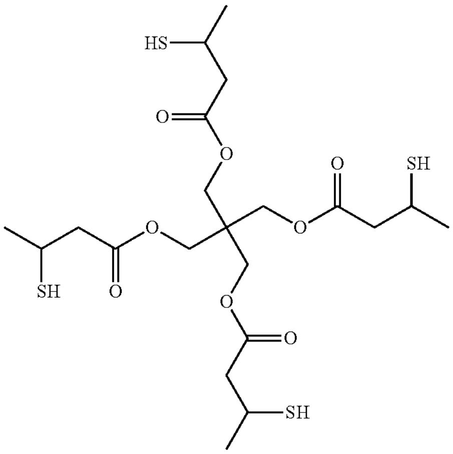

Example 2

A separation membrane was manufactured in the same manner as in Example 1, except that the composition of the slurry was changed as shown in Table 1 below. The film formation time (minimum exposure time) of the separation membrane was 30 seconds.

Example 3

A separation membrane was manufactured in the same manner as in Example 1, except that the composition of the slurry were changed as shown in Table 1 below. The film formation time (minimum exposure time) of the separation membrane was 20 seconds.

Example 4

A separation membrane was manufactured in the same manner as in Example 1, except that the composition of the slurry were changed as shown in Table 1 below. The film formation time (minimum exposure time) of the separation membrane was 20 seconds.

Comparative Example 1

A separation membrane was manufactured in the same manner as in Example 1, except that the composition of the slurry were changed as shown in Table 1 below. The film formation time (minimum exposure time) of the separation membrane was 60 seconds.

<Evaluation of Ionic Conductivity>

Test cells were fabricated using the separation membranes of Examples and Comparative Examples, thereby evaluating the ionic conductivity of the separation membranes. First, an upper cover (CR2032 cap available from Hohsen Corp.), a 1.6 mm thick plate spring, a 1.0 mm thick SUS spacer (2 sheets), a separation membrane, a gasket, a lower cover (CR2032 case available from Hohsen Corp.) were laminated in the stated order, the upper cover and the lower cover were caulked to fabricate a test cell, and the bulk resistance of the separation membrane was measured. The measurement device and measurement conditions were as follows.

Measurement device: VSP electrochemical measurement system (available from BioLogic)

Measurement temperature: 25° C.

AC amplitude: 10 mV

Frequency range: 10 mHz to 1 MHz

After the measurement, the ionic conductivity of the separation membrane was calculated according to the following formula (α).

$$\sigma = L/RA \quad (\alpha)$$

σ (S/cm): ionic conductivity

L (cm): thickness of separation membrane

R (Ω): bulk resistance

A ($cm^2$): cross-sectional area of SUS spacer

TABLE 1

| Item | | Comparative Example 1 | Example 1 | Example 2 | Example 3 |
|---|---|---|---|---|---|
| Addition amount of each material (g) | A-1000 | 1.0 | 1.0 | 1.0 | 1.0 |
| | ATM-35E | 3.0 | 3.0 | 3.0 | 3.0 |
| | EMITFSI | 2.0 | 2.0 | 2.0 | 2.0 |
| | LiTFSI | 0.4 | 0.4 | 0.4 | 0.4 |
| | Methylbenzolyformate | 0.1 | 0.1 | 0.1 | 0.1 |
| | PE-1 | 0.0 | 0.10 | 0.20 | 0.50 |
| Ionic conductivity (mS/cm) | | 0.05 | 0.06 | 0.07 | 0.07 |

As shown in Table 1, the separation membranes according to Examples had higher ionic conductivity that that of the separation membranes according to Comparative Example.

The separation membrane according to Examples enabled a film formation in a shorter time compared to the separation membrane according to Comparative Example.

<Evaluation of Solvent Separation Capability>

A separation membrane according to Examples or Comparative Examples, and separator (UP3085 available from Ube Industries Ltd.) were overlapped, and sandwiched between two silicone rubber sheets (thickness: 0.5 mm), which were placed between H-type cells. Dimethyl carbonate (DMC) was put into the cell on the separation membrane side, and the appearance of the separation membrane was visually observed after a predetermined number of days had passed. If the separator membrane is excellent in solvent separation capability, DMC hardly penetrates the separation membrane, which makes it difficult for DMC to penetrate the separation membrane. However, if the separation membrane is inferior in solvent separation capability, DMC permeates the separation membrane and permeates into the separator. Therefore, by observing the appearance of the separator and confirming whether or not DMC has permeated the separator, it is possible to evaluate the separation capability of the solvent (solvents corresponding to the first solvent and the second solvent) of the separation membrane.

The separation membranes according to Examples did not permeate DMC into the separator even after 3 days from the start of the test, indicating that they are separation membranes having excellent solvent separation capability.

DESCRIPTION OF REFERENCE NUMERALS

| | |
|---|---|
| 1: lithium ion secondary battery | 2: electrode group |
| 3: battery outer packaging body | 4: positive electrode current collector tab |
| 5: negative current collector tab | 6: positive electrode |
| 7: separation membrane | 8: negative electrode |
| 9: positive current collector | 10: positive electrode mixture layer |
| 11: negative current collector | 12: negative electrode mixture layer |

The invention claimed is:

1. A lithium ion secondary battery comprising a positive electrode mixture layer, a separation membrane, and a negative electrode mixture layer in the stated order, wherein:

the positive electrode mixture layer contains a positive electrode active material, a first lithium salt, and a first solvent, the negative electrode mixture layer contains a negative electrode active material, a second lithium salt, and a second solvent different from the first solvent, the separation membrane contains a polymer having lithium ion conductivity, a third lithium salt, and a third solvent, the polymer is a polymer of polymerizable components that include a monomer and a thiol compound, and the monomer includes a first monomer having two (meth) acryloyl groups and a second monomer having three or more (meth)acryloyl groups.

2. The lithium ion secondary battery according to claim 1, wherein:

the thiol compound has two or more thiol groups.

3. A separation membrane for being disposed between a positive electrode mixture layer and a negative electrode mixture layer, in a lithium ion secondary battery comprising a positive electrode mixture layer that contains a positive electrode active material, a first lithium salt and a first solvent, and a negative electrode mixture layer that contains a negative electrode active material, a second lithium salt and a second solvent different from the first solvent, wherein the separation membrane contains a polymer having lithium ion conductivity, a third lithium salt, and a third solvent, wherein the polymer is a polymer of polymerizable components that include a monomer and a thiol compound, and wherein the monomer includes a first monomer having two (meth)acryloyl groups and a second monomer having three or more (meth)acryloyl groups.

4. The separation membrane according to claim 3, wherein:

the thiol compound has two or more thiol groups.

5. A method for manufacturing a lithium ion secondary battery, comprising:

obtaining a positive electrode comprising a positive electrode mixture layer that contains a positive electrode active material, a first lithium salt, and a first solvent;

obtaining a negative electrode comprising a negative electrode mixture layer that contains a negative electrode active material, a second lithium salt, and a second solvent different from the first solvent;

forming a slurry containing polymerizable components including a monomer and a thiol compound, a tertiary lithium salt, and a tertiary solvent into a membrane, and then reacting the polymerizable components to obtain a separation membrane; and providing the separation membrane between the positive electrode and the negative electrode, wherein the monomer includes a first monomer having two (meth)acryloyl groups and a second monomer having three or more (meth)acryloyl groups.

6. The method according to claim 5, wherein:

the thiol compound has two or more thiol groups.

7. A method for manufacturing a separation membrane for being disposed between a positive electrode mixture layer and a negative electrode mixture layer, in a lithium ion secondary battery comprising a positive electrode mixture layer that contains a positive electrode active material, a first lithium salt and a first solvent, and a negative electrode mixture layer that contains a negative electrode active material, a second lithium salt and a second solvent different from the first solvent, wherein the method comprises forming a slurry containing polymerizable components including a monomer and a thiol compound, a tertiary lithium salt, and a tertiary solvent into a membrane, and then reacting the polymerizable components to obtain a separation membrane, and wherein the monomer includes a first monomer having two (meth)acryloyl groups and a second monomer having three or more (meth)acryloyl groups.

8. The method according to claim 7, wherein:

the thiol compound has two or more thiol groups.

* * * * *